Dec. 2, 1958 K. GROSSKOPF 2,862,859
DETECTING IMPURITIES IN GASES
Filed Feb. 8, 1956 4 Sheets-Sheet 4
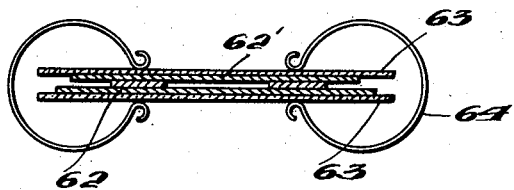
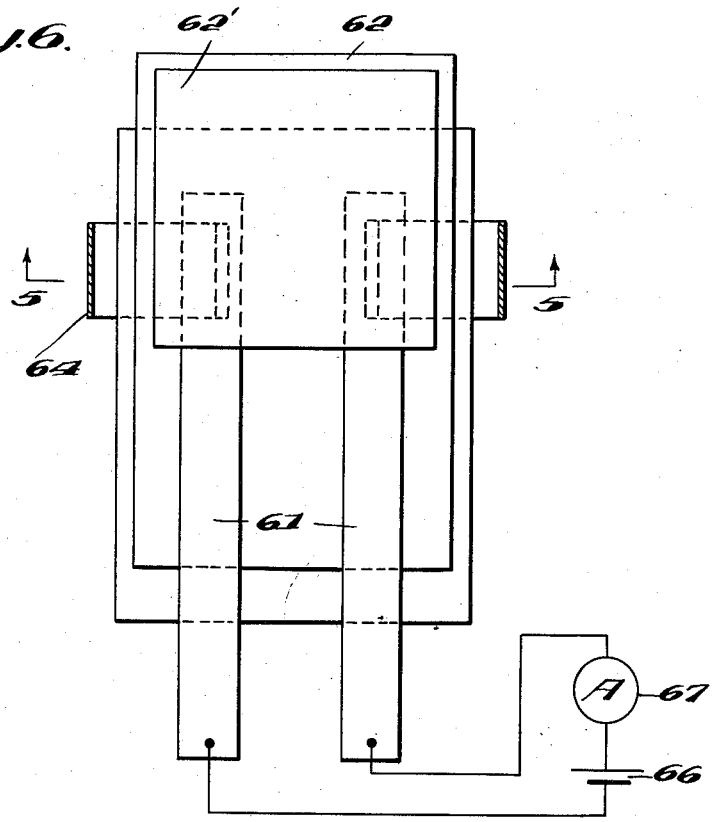
INVENTOR
KARL GROSSKOPF,
BY
ATTORNEYS

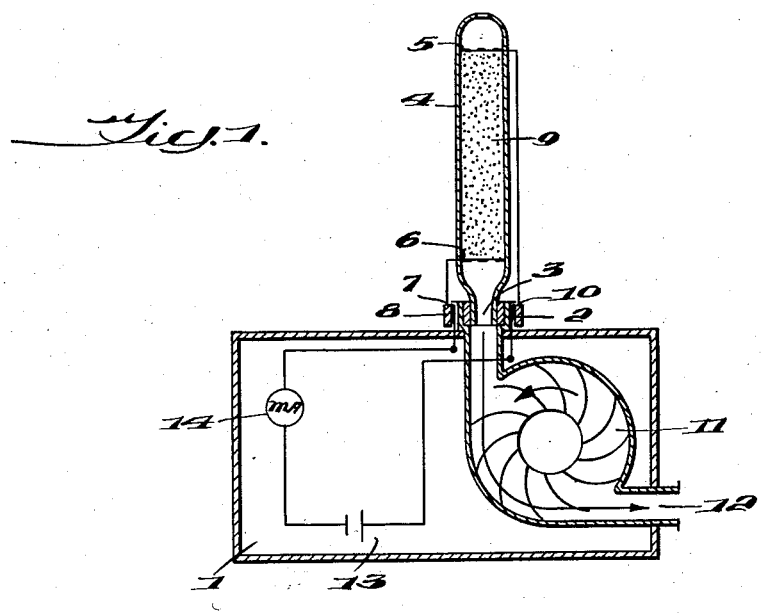
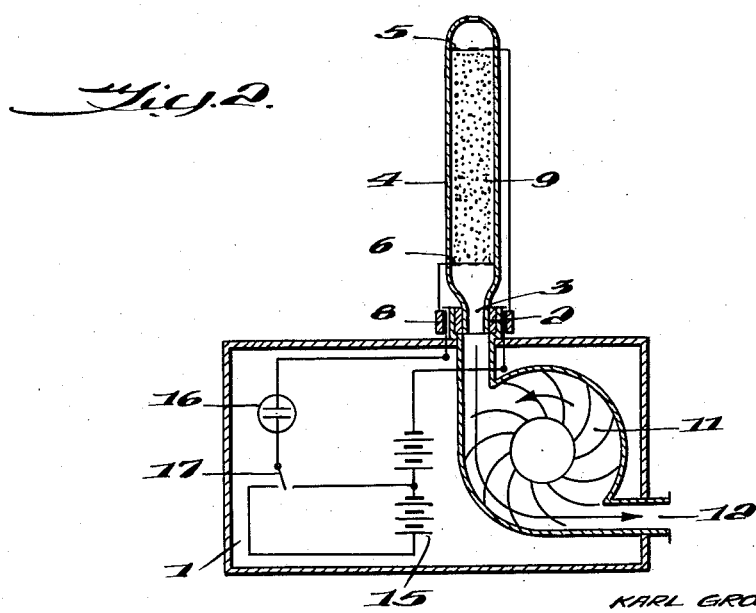

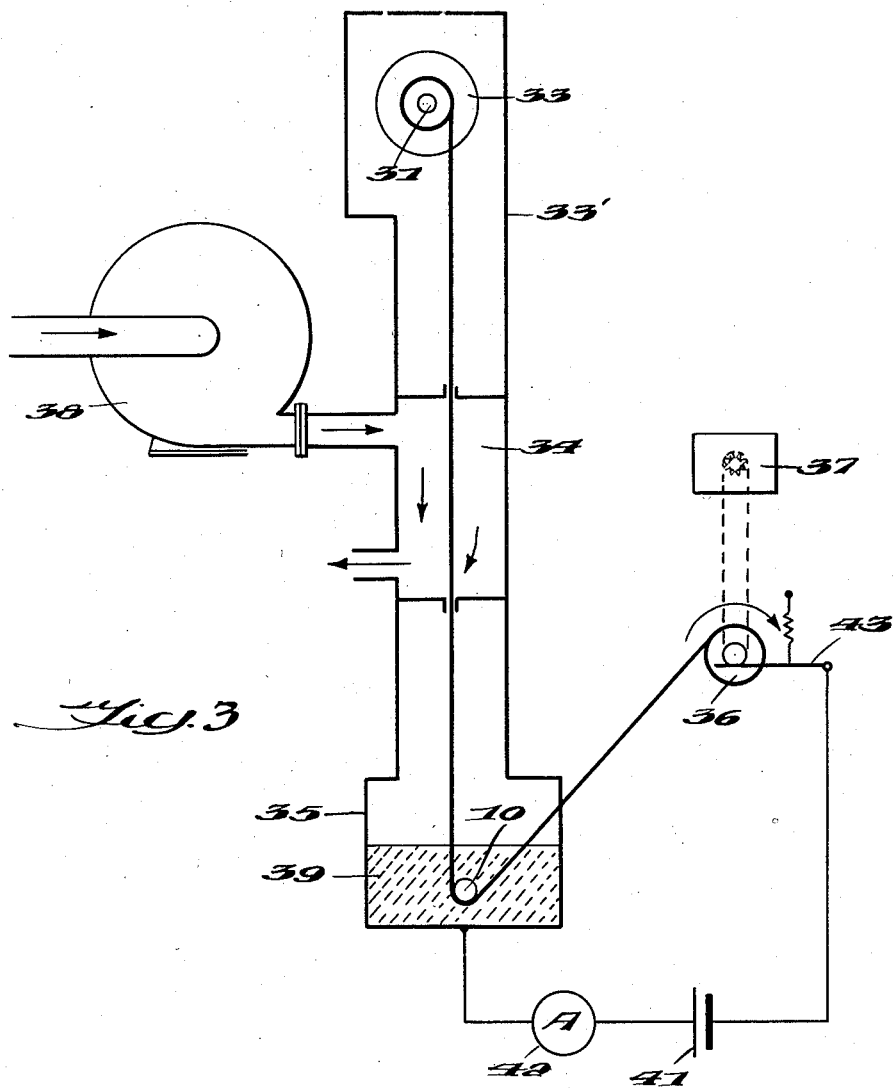

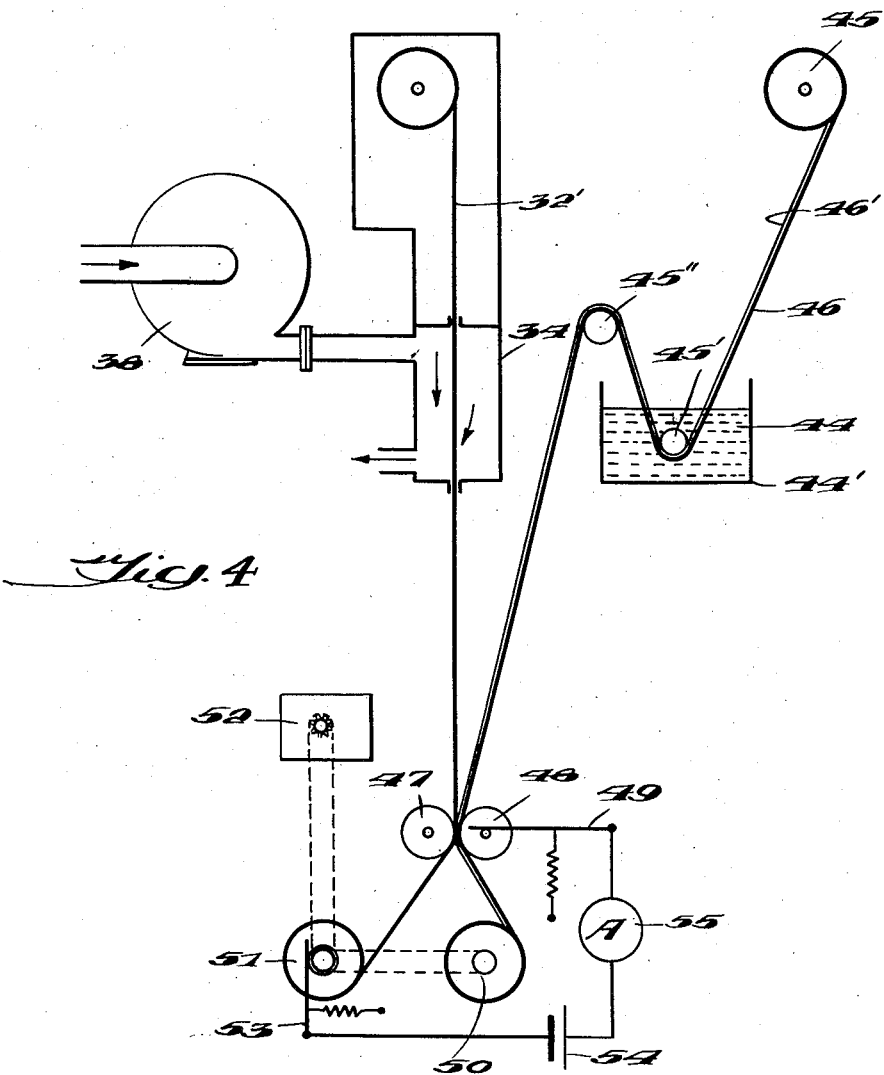

United States Patent Office 2,862,859
Patented Dec. 2, 1958

2,862,859

DETECTING IMPURITIES IN GASES

Karl Grosskopf, Lubeck, Germany, assignor to Dr. Otto Heinrich Drager, Lubeck, Germany Application February 8, 1956, Serial No. 564,304

21 Claims. (Cl. 204—1)

The invention relates to the detection of impurities in gases, particularly relatively inert gases such as air, and to a process and apparatus for detecting such impurities.

This application is a continuation in part of my application S. N. 329,187, filed January 2, 1953.

The primary object of the invention is to provide a simple, inexpensive and effective system for detecting impurities.

Another object of the invention is to provide a light, portable apparatus for this purpose.

A further object of the invention is to provide self-powered electrical apparatus for accomplishing this result.

Further objects and advantages of the invention will appear more fully from the following description, especially when taken in conjunction with the accompanying drawings which form a part thereof.

In the drawings:

Figs. 1 and 2 show two different modifications of an apparatus embodying the invention;

Figs. 3 and 4 show other modifications, showing a continuously moving strip;

Fig. 5 shows in plan view a further modification; and

Fig. 6 is a cross-section through the device of Fig. 5.

According to the invention, use is made of an electrolytic valve cell, through which the gas being tested is passed. By measuring the current flow through the cell, the presence or absence of impurities may be determined.

An electrolytic valve cell is composed of an electrolyte in contact with two electrodes, the electrolyte being such that it forms on one of the electrodes, at least when an electromotive force is imposed on the cell, a blocking layer which reduces or completely prevents the flow of current through the cell.

According to the present invention, the materials of the electrodes and the electrolyte are so chosen as to form a blocking layer which is destroyed, or at least reduced in effectiveness, by contact with the impurity for which the test is being carried out. Such destruction or reduction of the layer will reduce the resistance of the cell and cause a larger current to flow therethrough. By measuring the current flow, therefore, the presence of impurities can be detected. Of course, the blocking layer must be substantially unaffected by the gas being tested.

Conventional valve cells may be used. For example, a blocking layer can be produced in an iron-alkali cell by a voltage as low as 1 volt. An aluminum-sodium boratae cell can be used also. Other electrolytes, such as sodium citrate or sodium bicarbonate solutions, and other metals such as thallium, may also be used.

In the case of aluminum electrodes, an electromotive force of between 4 and 500 volts may be used. In the use of high voltages, a glow lamp may serve as the current indicator. Other types of measuring or indicating devices may, however, be employed.

In using the device, it is desirable to pre-form the blocking layer in the cell, especially when interchangeable or replaceable cells are used in a testing unit, so that the cell is ready for use at once.

The gas to be tested is sucked or blown through the cell in any suitable manner. The gas is brought in contact with the electrolyte and wetted thereby, so that it transfers any impurities to the electrolyte. Such impurities attack the blocking layer and thus reduce the resistance of the cell.

The gases may be introduced into the cell in the immediate vicinity of the electrode which carries the blocking layer, usually the anode, or may be directed in a jet towards the electrode.

In some instances, the voltage impressed on the cell may be adjusted so that a selective detection may be obtained. This is because certain impurities may destroy or reduce the blocking layer enough to decrease its resistance substantially, so that the measuring instrument will respond to low voltages, while another impurity attacks the layer so little that it can only be detected if a higher voltage is impressed on the cell. Therefore, when a low voltage is used, the device is sensitive to the first impurity only, and not to the second.

For example, an aluminum-sodium bicarbonate cell on which 100 volts is impressed is effective to detect the presence of nitrate groups such as vapors of nitric acid in the gas as well as that of halogens such as chlorine or fluorine. If the impressed voltage is reduced to 40 volts or less, the device no longer responds to the presence of nitrate groups but only to halogens. Thus by adjusting the voltage of such a cell selectivity in its action may be obtained.

Selectivity can also, of course, be obtained by choosing an electrolyte which forms a blocking layer that is not attacked by one of the impurities. Thus a cell using a nitrate electrolyte would respond to halogens but not to nitrate compounds.

Impurities which destroy the blocking layer may be, aside from the halogen, other ionizable inorganic and organic compounds. Even fractions of milligrams of such substances will reduce the effectiveness of the blocking layer and can thus be detected. In the case of organic halogen compounds, it appears that disassociation takes place in the electrolyte so that the halogen is set free. Also, substances may be added to the electrolyte which assist in the disassociation of organic compounds.

The invention has many uses in constantly testing for impurities without substantial power consumption, since the blocking layer normally prevents current flow. Thus a small proportion of a flowing stream of gas may be branched off and passed through such a cell. The process may also be used for checking the air either indoors or outdoors, by providing for the circulation of some of the air through such a cell.

More especially, a portable unit may be used which contains a source of electricity and an indicating or measuring device, a holder for the cell which connects it in circuit therewith, and a blower for causing air to pass through the cell. In such a case, the cell may be in the shape of a test tube secured in position by elastic clips so that it can be readily removed and replaced.

The electrodes may be arranged in various ways in the cell. It is advisable in portable units to have the electrolyte held by an absorbent material so as to prevent spilling or dripping.

In the form of the invention shown in Fig. 1, 1 is a portable case having an opening 3 in its wall surrounded by a collar 2. A tube 4, such as a test tube open at both ends, constitutes the cell. Electrodes 5 and 6, formed of perforated metal discs, wire gauze or screen or the like, for instance of iron, are mounted in the tube 4 near opposite ends and hold between them a body of absorbent material 9, such as glass wool, impregnated with the liquid electrolyte, such as a 20% alkali sodium hydroxide solution.

Within collar 2 are mounted spring clips 7 which engage and hold downwardly projecting terminals 8 on the bottom of the tube, each of these projections being electrically connected to one of the electrodes. The clips 7 have notches 10 for receiving the enlarged lower ends of the terminals. Clips 7 are in circuit with a battery 13 and a measuring instrument, such as an ammeter, 14. A blower 11 sucks air downward through tube 4 when it is inserted into collar 2 in the direction of arrow 12.

In such a cell, the blocking layer can be preformed by passing through the cell a voltage of 1 volt, until the milliammeter shows that substantially no current is flowing through the cell. This may require 15 to 30 minutes. Thereafter, the device is sensitive to halogens such as chlorine. With an anode of 2 cm.$^2$, and a voltage of 2 volts, the sensitivity is as follows:

| | Ma. |
|---|---|
| 1.4 μg. Cl in 100 cc. electrolyte | 0.05 |
| 3 μg. Cl in 100 cc. electrolyte | 0.18 |
| 5 μg. Cl in 100 cc. electrolyte | 0.35 |

A similar cell is used in Fig. 2, but may have aluminum electrodes and a 2% sodium bicarbonate solution as electrolyte. The current source is a battery 15, while the indicator is a glow lamp 16. The circuit is such that, by switch 17, a part of the battery may be cut out of the circuit. Such a device, as explained above, may be used to detect both nitrates and halogens, or halogens only.

In such a cell, the blocking layer may be formed in the cell itself, or it may be preformed. For example, the electrode of 2 cm.$^2$ area may be subjected to a voltage of 90 v. in an electrolyte composed of 40 g. of boric acid dissolved in 1 liter of distilled water, adjusted to a conductivity of 1500–2000 μs./cm., which can be done by adding to the solution about 0.1 cm.$^3$ of 25% ammonia solution. This is continued until the blocking layer will pass less than 0.05 ma. at 50 v.

The blocking layer can also be formed in the cell itself. In such a cell, a voltage of 2 v. will form in about 3 minutes a blocking layer which will permit the passage of less than 0.02 ma.

Such a cell has the same sensitivity at 2 v. as described above in connection with Fig. 1 for halogens. At higher voltages it will detect nitrates as well.

Where the blocking layer is preformed, an anode of 100 mm.$^2$ area with a voltage of 50 v., containing 20 cc. of electrolyte, will detect carbon disulfide in the following proportions:

| Mg./liter | Ma. |
|---|---|
| 1 | 0.24 |
| 3 | 0.8 |
| 5 | 1.2 |

Other nitrogen compounds, such as nitrous oxide, can also be detected by such an arrangement.

Trichloroethylene can also be detected in these devices in the following concentrations, with a potential of 50 v.:

| Mg./liter | Ma. |
|---|---|
| 1 | 0.1 |
| 3 | 0.8 |
| 5 | 3.0 |

Fig. 3 shows a further modification of the invention. In this form, the air to be tested is brought into contact with a flexible material such as a strip of metal foil, or metal wire, or the like, which is passed through a testing cell, either while the gas to be tested is in contact with the flexible material or thereafter. The movement of the flexible metal body may be continuous or intermittent, but in either case, a simple arrangement for continuous measurement of impurities is provided. This is true because the flexible metallic member carries off the impurities so that they do not accumulate in the valve cell. If the surface of the flexible metallic material is roughened, a larger absorption surface is provided and the sensitivity is increased.

The blocking layer may be pre-formed on the anode by the use of boric acid or sodium borate in the manner heretofore described under the influence of an electric current. Apparently the impurities are absorbed by the flexible member and then, in the presence of the electrolyte, tend to weaken or destroy the blocking layer so as to increase the passage of current through the cell.

In forming the blocking layer in such a system, as much as 500 v. may be used. Then even a voltage of as little as 2 v. would cause a measurable flow of current when tests are being made for halogens, such as chlorine.

This arrangement can depend on current flow with a constant voltage or can measure the voltage needed to produce a constant current flow through the cell.

In such a device, it is preferable to pass the flexible material through a chamber through which the gas to be tested is also passed at constant speed.

As shown in Fig. 3, shaft 31 carries a spool 33 of isolated material on which is wound a flexible metal material, such as a wire 32 of pre-anodized aluminum, treated in a 2% sodium borate solution at 400 v. and a 1 mm. diameter. The feeding means is enclosed in a casing 33' to prevent access of air. The wire runs through a chamber 34, through which all or part of the gas to be tested is fed by pump 38.

The wire passes from chamber 34, in which it comes in contact with any impurity present in the air being tested and absorbs such impurity, to the measuring cell 21 of which the wire forms an electrode.

The wire passes under a roller 40 through electrolyte 39 (for example, a 2% solution of sodium borate) held in container 35, which forms the other electrode and is formed of a metal such as aluminum or copper. The electric current is completed through ammeter 42, battery 41 and brush 43 which rests on the axle of a metallic reel 36 on which the wire is wound and to which the end of the wire is connected. The reel 36 is driven by constant speed motor 37, operating at a low speed so as to draw the wire through chamber 34 at a speed of 2 to 4 cm. per minute. Motor 37 may be a clock work, and electric motor or the like. Chamber 34 may be made of a transparent material such as Plexiglas. It is of tubular form and has a volume of 100 cc. The openings in the top or bottom fit the wire 32 as closely as possible while avoiding substantial friction.

The velocity of air flowing through tube 34 need not be measured exactly, as the apparatus may be calibrated on the rate of absorption, but a constant flow of air is desirable. When a condition of balance is reached after the device is put into operation, the quantity of gas absorbed depends only on the concentration of impurities in the gas being tested.

Instead of wire 32, a smooth or roughened aluminum foil strip may be used.

With the arrangement of Fig. 3, the wire passing through chamber 34 will absorb a portion of any impurities present in the gas beting tested. When this portion of the strip reaches cell 35, the contact of the impurities with the blocking layer will cause the blocking layer to break down, at least in part, and current will then flow in the circuit, ammeter 42 then indicates the presence and, at least roughly, the concentration of the impurities in the gas.

This device may detect halogens such as chlorine, fluorine, or bromine with a voltage of 10 v. or less, 2 v. being preferred. It is sensitive to quantities of as low as 2 to 5 mg. per liter of air being tested, such concentration giving currents of 1 to 3 ma. Organic halogen compounds produce similar results. Voltages of 5 v.

to 100 v. will produce detectable currents when similar proportions of aromatic hydrocarbons are present, as will be further explained below.

In the form of Fig. 4, both the electrodes and the electrolyte are being constantly renewed. In this case also, both electrodes are provided with blocking layers which has the advantage that, if the polarity of the current source is reversed, the device will still operate.

In Fig. 4, pre-anodized strip 32' is passed through chamber 34 to absorb any impurities from the gas being tested. It then passes over roller 47 to metallic spool 51 driven by constant slow speed motor 52. Brush 53 rests against the axle of spool 51 to which the end of wire 32' is connected.

Spool 45 carries a second pre-anodized strip 46 on one face of which is a layer 46' of absorptive material as wicking. These strips pass through tank 45' containing an electrolyte (2% sodium borate solution) being guided into and out of the tank by rollers 45', 45''. The strips then pass to roller 48, facing roller 47, with strip 46' facing electrode 32'. Strips 46, 46' then pass to spool 50.

Brush 49 rests against the axle of metallic roller 48. The circuit runs from brush 53 through battery 54, ammeter 55, brush 49, roller 48, strips 46, 46', 32' to roller 51.

Spool 50 is driven in synchronism with spool 51.

In such an arrangement any impurities will absorb on strip 32'. When this reaches rollers 47, 48, such impurities will, on contact with the blocking layer impair the blocking layer on strip 32' (or strip 46' if the current is reversed) and will cause a current to flow and be detectable by ammeter 55. This arrangement is especially desirable where the concentration of impurities is high, since the electrolyte is not poisoned by the accumulation of impurities therein.

This arrangement has in general the same sensitivity as that of Fig. 3.

In the arrangement of Figs. 5 and 6, two aluminum strips 61, 10 mm. by 50 mm. are laid in parallel coplanar spaced relation 10 mm. apart between two sheets 62, 62' of filter paper, which in turn are overlaid by glass plates 63, the parts being held together by spring clips 64. The filter papers extend beyond the glass plates as shown in the top of Fig. 6 (the upper glass plates being omitted in Fig. 5). A battery 66 and an ammeter 67 complete the circuit from electrodes 61.

The electrodes are pre-anodized as described above at voltages of 10 v. to 50 v. The filter paper is then saturated with a 2% aqueous boric acid solution adjusted to a conductivity of about 5000 $\mu s$./cm. with sodium acetate.

Such an arrangement can detect impurities in gases and in liquids. It is primarily intended for individual tests, rather than continuous testing. A voltage of 2 v. is used in the system.

If gas is being tested, it may be brought into contact with the filter paper, the impurities will be absorbed in the electrolyte, and will destroy or impair the blocking layer so that current will flow in the circuit. Liquids can also be tested by bringing them into conduct with the protruding parts of the filter paper. Likewise, gases can be tested by passing them through liquids which absorb the impurities, and then bringing these liquids into contact with the filter paper. The liquids may flow continuously in a trough into which the protruding parts of the filter paper depend. With this device a concentration of 1.4 p. p. m. of HCl in air can be detected with electrodes of 2 cm.$^2$ area and a voltage of 2 v., thus producing a current of 0.05 ma.

The invention is also applicable to the detection of mercury in air or other gases. If halogens or halides which also destroy the blocking layer are likely to be present, these can be removed by first passing the gas through a container filled with caustic sodium solution or through a body of granular alkali or akaline earth material such as quick lime.

The impairment of the blocking layer is proportional to the concentration of mercury so that a quantitative determination of even small quantities of mercury is possible. With the arrangement of Fig. 4 an aluminum foil 2 mm. wide exposed for thirty seconds to the air being tested will give a measurable current for the concentrations of mercury as low as 1 mg. per cubic meter of air. With the arrangement of Figs. 5 and 6, aluminum foil strips having areas of 2 cm.$^2$, pre-anodized at 45 v. and using a test voltage of 2 v., may be employed.

The measuring instrument in this case is an ohmmeter. The anodized foil is exposed to 50 cc. of air for thirty seconds. The following results have been found:

| Mg. Hg/m.$^3$ air | Resistance (ohms) |
|---|---|
| 0 | 10,000 |
| 0.013 | 1,100 |
| 0.065 | 350 |
| 0.13 | 150 |

Aromatic and aliphatic hydrocarbons can also be detected since these likewise impair the blocking layer, in the same manner as mercury. The impairment is different for different hydrocarbons, which makes it possible, to some degree, to determine which ones are present. For example, in the arrangement of Figs. 5 and 6, benzol in concentrations of 5 mg./per liter can be detected with a voltage of 12 v., an anode surface of 1 cm.$^2$ giving a current of 0.1 ma. The same current flows with a similar concentration of toluene, with 4 v., and xylene, with 2 v.

Both the liquid and gaseous hydrocarbons can be detected, the latter being such as propane, butane and methane. When the arrangement of Fig. 4 is used for such hydrocarbons in air, a roughened aluminum foil is used. It has been found that the absorption of such substances increases more than proportionately as the area of the foil in increased by roughening. For example, if a smooth anodized foil produces a current of 0.1 ma. which gives concentration of a hydrocarbon and an increase of the surface area 4 or 8 times, the roughening will increase the current to 0.8 ma. and 3.6 ma., respectively.

While I have described herein some embodiments of my invention, I wish it to be understood that I do not intend to limit myself thereby except within the scope of the claims hereto or hereinafter appended.

I claim:

1. A method for detecting impurities in a fluid by means of electrodes at least one of which has a blocking layer thereon and an electrolyte, said impurities being capable of at least partially destroying the blocking layer in the presence of the electrolyte, which comprises bringing said impurities into contact with the electrodes and electrolyte and supplying direct electric current to said electrodes in a direction to be normally blocked by said blocking layer, whereby an increase in said current indicates the presence of impurities in the liquid.

2. A method as claimed in claim 1 in which the fluid is a gas and said gas is passed through a body of porous material saturated with the electrolyte and in contact with the electrodes.

3. A method as claimed in claim 1 in which the fluid is a gas, and said gas is brought into contact with one of the electrodes, so that the impurities are absorbed therein and the electrode is thereafter brought into contact with the electrolyte.

4. A method as claimed in claim 3 in which both the electrodes have blocking layers thereon.

5. A method as claimed in claim 1 in which the electrolyte is capable of forming a blocking layer on at least one of the electrodes.

6. A method as claimed in claim 5 in which at least one of the electrodes is iron and the electrolyte is a caustic soda solution.

7. A method as claimed in claim 5 in which at least one electrode is aluminum and the electrolyte is a sodium bicarbonate solution.

8. A method as claimed in claim 5 in which at least one electrode is aluminum and the electrolyte is a sodium borate solution.

9. A method as claimed in claim 1 in which the impurity is a substance selected from the group consisting of halogens and halogen compounds.

10. A method as claimed in claim 1 in which the impurity is mercury.

11. A method as claimed in claim 1 in which the impurity is a hydrocarbon.

12. A device for detecting impurities in gases, comprising a chamber, positively acting means to pass the gas through the chamber, means to pass through the chamber in contact with the gas a flexible metallic member capable of absorbing the impurities, an electrolyte, means to pass said member through the electrolyte, said member forming a first electrode of a valve cell, a second electrode in contact with said electrolyte forming the other electrode of said cell, at least one of said electrodes having a blocking layer therein capable of being at least partially destroyed by said impurities in the presence of said electrolyte, an ammeter, a circuit including said electrodes and said instrument and means to supply to said circuit a direct electric current in a direction to be blocked by said blocking layer.

13. A device for testing impurities in gases, comprising chamber pump means to pass the gas through the chamber, means to pass through the chamber in contact with the gas a flexible metallic member capable of absorbing impurities, a metallic container and electrolyte in said container, means to pass said member through said electrolyte, said member forming a first electrode and said container including a second electrode of a valve cell, at least one of said electrodes having a blocking layer thereon capable of being at least partially destroyed by said impurities in the presence of said electrolyte, an ammeter, a circuit including said electrodes and said instrument and means to supply to said circuit a direct electric current in a direction to be blocked by said blocking layer.

14. A method for detecting impurities in a fluid by means of electrodes at least one of which has a blocking layer thereon and an electrolyte, said impurities being capable of at least partially destroying the blocking layer, which comprises bringing said impurities into contact with the electrode having the blocking layer thereon and supplying direct electric current to said electrodes when both are in contact with the electrolyte in a direction to be normally blocked by said blocking layer, whereby an increase in said current indicates the presence of impurities in the fluid.

15. A device for testing impurities in fluids which comprises an electric valve cell having electrodes and an electrolyte between and in contact with the electrodes, at least one of said electrodes having a blocking layer thereon capable of being at least partially destroyed by the impurities, pump means to bring such impurities into contact with the electrodes having the blocking layer thereon, an ammeter, a circuit including said electrodes and said instruments, and means to supply direct current to said circuit in a direction to be normally blocked by said blocking layer.

16. In a device as claimed in claim 15, said device including a body of porous materials between said electrodes, said electrolyte being absorbed by said porous material, and means to pass the gas through the porous material.

17. A device as claimed in claim 15, in which the electrolyte is capable of forming a blocking layer on at least one of the electrodes.

18. Apparatus for the detection of impurities in gases, which comprises a portable unit including an ammeter, an electric valve cell comprising a container having therein an electrode having a blocking layer thereon capable of being at least partially destroyed by such impurities, said container having an inlet and an outlet, a circuit including said electrode and said instrument, means to supply direct current to said circuit in a direction to be normally blocked by said blocking layer, and pump means to pass the gas to be tested through the cell from the inlet to the outlet and in contact with the electrode having the blocking layer thereon, said cell being removable from the unit for replacement.

19. Apparatus for the detection of impurities in gases, which comprises a portable unit including an ammeter, an electric valve cell comprising a container having therein an electrode and an electrolyte capable of forming a blocking layer on the electrode capable of being at least partially destroyed by such impurities, said container having an inlet and an outlet, a circuit including said electrode and said instrument, means to supply direct current to said circuit in a direction to be normally blocked by said blocking layer, and pump means to pass the gas to be tested through the cell from the inlet to the outlet and in contact with the electrode having the blocking layer thereon, said cell being removable from the unit for replacement.

20. A device for detecting impurities in gases by the use of an electrolyte, comprising a chamber, pump means to pass the gas through the chamber, means to pass through the chamber in contact with said gas a flexible metallic member having thereon a layer of a material capable of blocking a direct current therethrough in one direction, of being at least partially destroyed by the impurities in the presence of the electrolyte and of absorbing the impurities, means to feed a second flexible metallic member and a flexible absorptive material impregnated with such electrolyte, means to bring said metallic members after passage of said first member through said chamber into contact with opposite faces of said absorptive material, said members forming at the point of such contact electrodes of a valve cell, an ammeter, a circuit including said electrodes and said instrument, and means to supply direct current to said circuit in a direction to be blocked by said blocking layer.

21. A device as claimed in claim 20 in which said electrolyte is capable of forming the blocking layer on said electrodes.

References Cited in the file of this patent

UNITED STATES PATENTS

| | | |
|---|---|---|
| 2,028,312 | Borhauser | Jan. 21, 1936 |
| 2,052,962 | Booe | Sept. 1, 1936 |
| 2,057,315 | Robinson | Oct. 13, 1936 |
| 2,278,248 | Darrah | Mar. 31, 1942 |
| 2,373,273 | Sziklai | Apr. 10, 1945 |
| 2,591,042 | Berman et al. | Apr. 1, 1952 |
| 2,651,612 | Haller | Sept. 8, 1953 |
| 2,732,335 | Glass | Jan. 24, 1956 |

OTHER REFERENCES

Anal. Chem., vol. 25, pages 586–591, April 1953, article by Jacobson.